(12) United States Patent
Kato

(10) Patent No.: US 7,382,419 B2
(45) Date of Patent: Jun. 3, 2008

(54) LIQUID CRYSTAL TELEVISION AND LIQUID CRYSTAL DISPLAY APPARATUS

(75) Inventor: Yoshiharu Kato, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 548 days.

(21) Appl. No.: 11/166,469

(22) Filed: Jun. 23, 2005

(65) Prior Publication Data

US 2006/0001783 A1     Jan. 5, 2006

(30) Foreign Application Priority Data

Jun. 25, 2004   (JP)   ............ 2004-003728 U (51) Int. Cl.
*H04N 5/64*  (2006.01)
(52) U.S. Cl. ............ 348/794; 348/790; 348/836
(58) Field of Classification Search ........ 348/790, 348/794, 836, 838, 843; 248/919, 920, 922–923; 345/205, 87, 905; *H04N 5/64*
See application file for complete search history.

(56) References Cited

U.S. PATENT DOCUMENTS 5,969,776 A * 10/1999 Han ............... 348/836
6,307,530 B1 * 10/2001 Cho ............... 345/87
6,343,006 B1 * 1/2002 Moscovitch et al. ........ 361/681
6,352,322 B1 * 3/2002 Nakao ............... 312/223.1

FOREIGN PATENT DOCUMENTS

| JP | 60-142562 | 9/1985 |
| JP | 3069339 | 3/2000 |
| JP | 2000-249133 | 9/2000 |
| JP | 2000-270282 | 9/2000 |
| JP | 3077169 | 9/2000 |
| JP | 2001-142408 | 5/2001 |
| JP | 2002-106542 | 4/2002 |
| JP | 3097542 | 8/2003 |

* cited by examiner

*Primary Examiner*—Trang U. Tran
(74) *Attorney, Agent, or Firm*—Peter Ganjian (57) ABSTRACT

A liquid crystal display apparatus including a tilt mechanism, which is capable of preventing an inadvertent insertion of a finger of a user in a groove of a bracket of the tilt mechanism even while a cover for concealing the bracket is removed, wherein provided is a washer-like member or inadvertent-insertion preventer which has a through-hole or perforated portion through which a pawl formed in a main-body bracket or one of two brackets is inserted, and is attached to the pawl at a position to contact a stand bracket or the other of the two brackets, by inserting the pawl through the through-hole. The washer-like member is preferably made of a plastic and sandwiched between the two brackets.

8 Claims, 10 Drawing Sheets

PRIOR ART

EMBODIMENT

RIGHT ←——→ LEFT

LIQUID CRYSTAL TELEVISION AND LIQUID CRYSTAL DISPLAY APPARATUS

BACKGROUND OF THE INVENTION

1. Field of the Invention

The present invention relates to a liquid crystal television and a liquid crystal display apparatus which comprise a stand, and a main body having a liquid crystal display surface on which images are presented, and being supported by the stand tiltably around a rotation axis with respect to the stand.

2. Description of the Prior Art

There is known a liquid crystal television comprising a stand, a main body, and a bolt and a nut. A first bracket or stand bracket is fixed to the stand. The main body has a cabinet to which a second bracket or mainbody bracket is fixed, and a liquid crystal display surface on which images are displayed, and the main body is supported by the stand tiltably around a horizontal rotation axis with respect to the stand. The bolt and nut are attached to the stand bracket and mainbody bracket to be rotatable around the rotation axis relatively to the two brackets. A hole is formed through each of the brackets and the bolt is inserted through the holes, thereby aligning the brackets along the rotation axis while permitting a relative rotation of the brackets around the rotation axis. The mainbody bracket has a pawl protruding along the rotation axis toward the stand bracket, while the stand bracket has a cutout or groove with which the pawl engages such that the pawl is brought into contact with opposite ends of the groove when the mainbody bracket is rotated in opposite directions, thereby delimiting rotation of the pawl. The brackets are disposed on the rear side of the main body of the television, and usually covered with a plastic cover.

In the television as described above, the main body having the liquid crystal display surface can be forward and rearward turned or tilted. That is, with a television of picture tube type, images are clearly visible even when the display surface is seen from a position considerably deviated from the front side of the surface. However, with a liquid crystal television, images are not clearly visible when the display surface is seen from such a position, due to the characteristics of the liquid crystals and other reasons, and thus the main body of the liquid crystal television is made tiltable, enabling a user to see the liquid crystal display surface at a suitable angle. Japanese Patent Application Laid Open No. 2001-142408 discloses an example of such a conventional image display apparatus where the tilting of the main body is allowed.

In the conventional arrangement, however, a finger of the user may be inadvertently put in the groove of the stand bracket, with which the pawl of the mainbody bracket rotatably engages, while the cover concealing the brackets is removed. This is the case with the arrangement disclosed in the above-mentioned publication. Although Japanese Patent Laid Open No. 2000-270282 and Japanese Utility Model Laid Open No. 60-142562 disclose respective tilt mechanisms, they are basically different in structure, since the former uses a slider rotated along a spherical surface while the latter uses a cam and a movable member.

SUMMARY OF THE INVENTION

The present invention has been developed in view of the above object, and therefore its object is to provide a liquid crystal display apparatus having a tilt mechanism where a finger of the user can not be inserted in the groove of the bracket even where a cover concealing the brackets is not present.

To attain the object, one aspect of the present invention resides in a liquid crystal television comprising: a stand to which a stand bracket is fixed, the stand bracket being made of a metal and having a first through-hole and a groove; a main body which has a resin cabinet to which a mainbody bracket made of a metal and having a second through-hole and a pawl is fixed, the main body being supported to be tiltable with respect to the stand around a rotation axis, and the pawl protruding along the rotation axis toward the stand bracket to engage with the groove of the stand bracket; a bar member in the form of a metallic bolt comprising: a bolt body inserted through the first and second through-holes to be attached to the stand bracket and the mainbody bracket which are disposed adjacent to each other around and along the rotation axis, such that the stand bracket and the mainbody bracket are rotatable relatively to each other around the rotation axis, the relative rotation of the stand bracket and the mainbody bracket being limited such that rotation of the pawl is limited to a rotation range by contact of the pawl with opposite ends of the groove, and the bolt body having a screw thread formed on one of its opposite axial end portion; and a head formed at one of opposite axial ends of the bolt body which is remote from the screw thread, and having a diameter larger than those of the first and second through-holes; a metal nut threadedly engaging the screw thread; a helical spring through which the bolt body is insertable, and which has an internal diameter smaller than the diameter of the head and a major diameter of the nut; the bolt body being inserted through the first and second through-holes and the helical spring, with the screw thread engaging the nut, and with the helical spring being compressed; and a plastic washer-like member which has a third through-hole through which the pawl is inserted and the bolt is not inserted, and is attached between the stand bracket and the mainbody bracket with the pawl inserted through the third through-hole, the washer-like member having a shape to conceal an entirety of the groove as seen from the side of the washer-like member in the direction of the rotation axis wherever the pawl is located within the rotation range.

According to this arrangement, the entirety of the groove of the stand bracket is covered by the washer-like member wherever the pawl is placed in its rotation range, reliably preventing insertion of a finger of a user in the groove of the stand bracket even without a cover for concealing the brackets. With the washer-like member attached to the pawl by being sandwiched between the brackets, it is not necessary to configure the pawl to prevent the washer-like member from coming off, enabling to attach the washer-like member to the pawl with a simple structure. Since the washer-like member is made of a plastic, the main body of the television can be smoothly tiltable. Since it is not required to insert the bolt through the washer-like member, the configuration of the washer-like member is relatively simple. Further, when the main body is tilted, the main body can be held at a desired tilt position as a force for holding the position based on a biasing force of the helical spring as being compressed is adjusted.

As a more general arrangement, another aspect of the present invention resides in a liquid crystal display apparatus comprising: a stand to which a first bracket is fixed; a main body having a cabinet to which a second bracket is fixed; the first and second brackets being disposed adjacent to each other around and along a rotation axis to be rotatable around the rotation axis relatively to each other, one of the first and second brackets having a pawl protruding to the other of the brackets, while the other bracket having a groove with which the pawl engages such that the relative rotation of the brackets is limited to a rotation range by contact of the pawl with opposite ends of the groove; and an inadvertent-insertion preventer for inhibiting an object from being inadvertently put in the groove, the preventer having a perforated portion, and being attached, at a position to contact the other bracket, to the pawl by insertion of the pawl through the perforated portion.

This arrangement where the inadvertent-insertion preventer is attached to the pawl of the other bracket by inserting the pawl through the perforated portion, covering the groove of the other bracket with which the pawl engages, enables to prevent insertion of the finger in the groove of the bracket without a cover concealing the brackets.

The liquid crystal display apparatus to which the invention is applied may be a liquid crystal television including a receiving device for receiving airwaves and outputting images, or may be a liquid crystal monitor which does not include such a receiving device.

The inadvertent-insertion preventer may be attached to the pawl by being sandwiched between the first and second brackets, making it unnecessary to configure the pawl to inhibit the preventer from coming off.

According to this arrangement, since the pawl need not be configured to inhibit the inadvertent-insertion preventer from coming off, the preventer can be attached to the pawl with a simple structure.

It may be arranged such that each of the first and second brackets is made of a metal, while the inadvertent-insertion preventer is made of a plastic and its perforated portion is a through-hole through which the pawl is inserted. According to this arrangement, the main body of the television can be smoothly tiltable.

It may be arranged such that the apparatus further comprises a bar member, the first bracket has a first through-hole whose center is on the rotation axis while the second bracket has a second through-hole whose center is on the rotation axis, the bar member is attached to the first and second brackets on and along the rotation axis by being inserted through the first and second through-holes such that the bar member is rotatable relatively to the first and second brackets, the pawl protrudes along the rotation axis, and the perforated portion of the inadvertent-insertion preventer is a through-hole through which the pawl is inserted and the bar member is not inserted. According to this arrangement, it is not necessary to insert the bar member providing a rotation axis through the inadvertent-insertion preventer. Consequently, the inadvertent-insertion preventer is allowed to have a simple shape like a washer or an O-ring, for instance.

According to this arrangement, the bar member providing the rotation axis need not be inserted through the inadvertent-insertion preventer, thereby enabling to form the preventer simple in structure.

It may be arranged such that the apparatus further comprises a metal nut and a helical spring, the bar member is a metal bolt having a bolt body inserted through the first and second through-holes and the helical spring, and having a head at its one of opposite axial ends and a screw thread at its other axial end, the head has a diameter larger than those of the first and second through-holes, the metal nut threadedly engages the screw thread formed on the other end of the bolt body while the helical spring has an internal diameter smaller than the diameter of the head and a major diameter of the nut, and the bolt body is inserted through the first and second through-holes and the helical spring, with its screw thread threadedly engaging the nut, and with the helical spring being compressed. According to this arrangement, the main body can be held at a desired position when tilted, by a simple structure using a bolt, a nut, and a helical spring, that is, by utilizing a biasing force or restoring force of the helical spring as being compressed. The biasing force of the helical spring is adjustable by adjustment of the degree of tightening of the nut.

The inadvertent-insertion preventer may have a shape to conceal an entirety of the groove when the other bracket having the groove is seen from the side of the inadvertent-insertion preventer in the direction of the rotation axis wherever the pawl is located within the rotation range. According to this arrangement where the entirety of the groove of the bracket is covered by the inadvertent-insertion preventer wherever the pawl is placed in its rotation range, insertion of a finger in the groove of the other bracket is more reliably prevented even without a cover concealing the brackets.

DETAILED DESCRIPTION OF THE PREFERRED EMBODIMENTS

Figure 1:
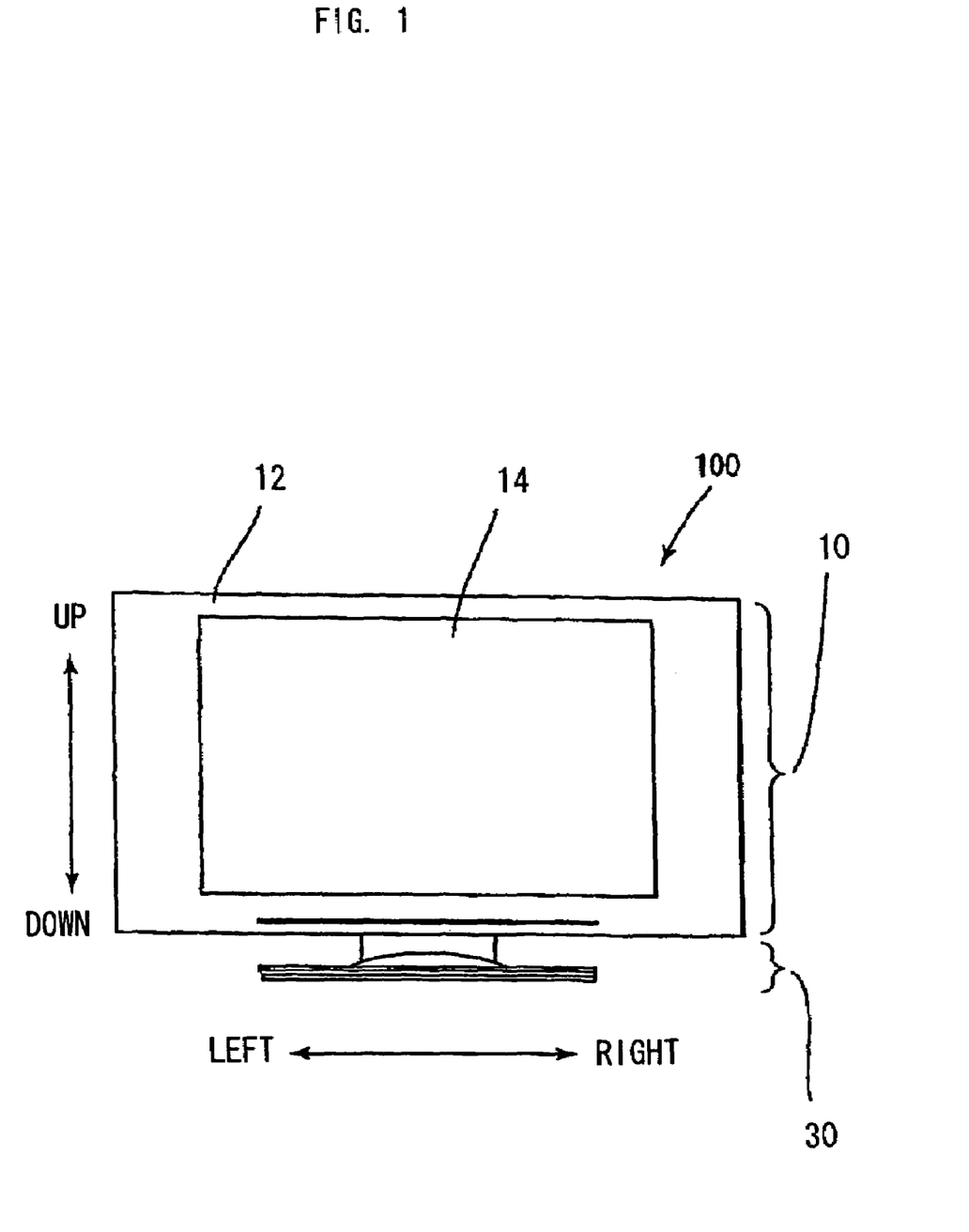
FIG. 1 is a front elevational view of a liquid crystal display apparatus in the form of a liquid crystal television, according to one embodiment of the invention.
Figure 2:
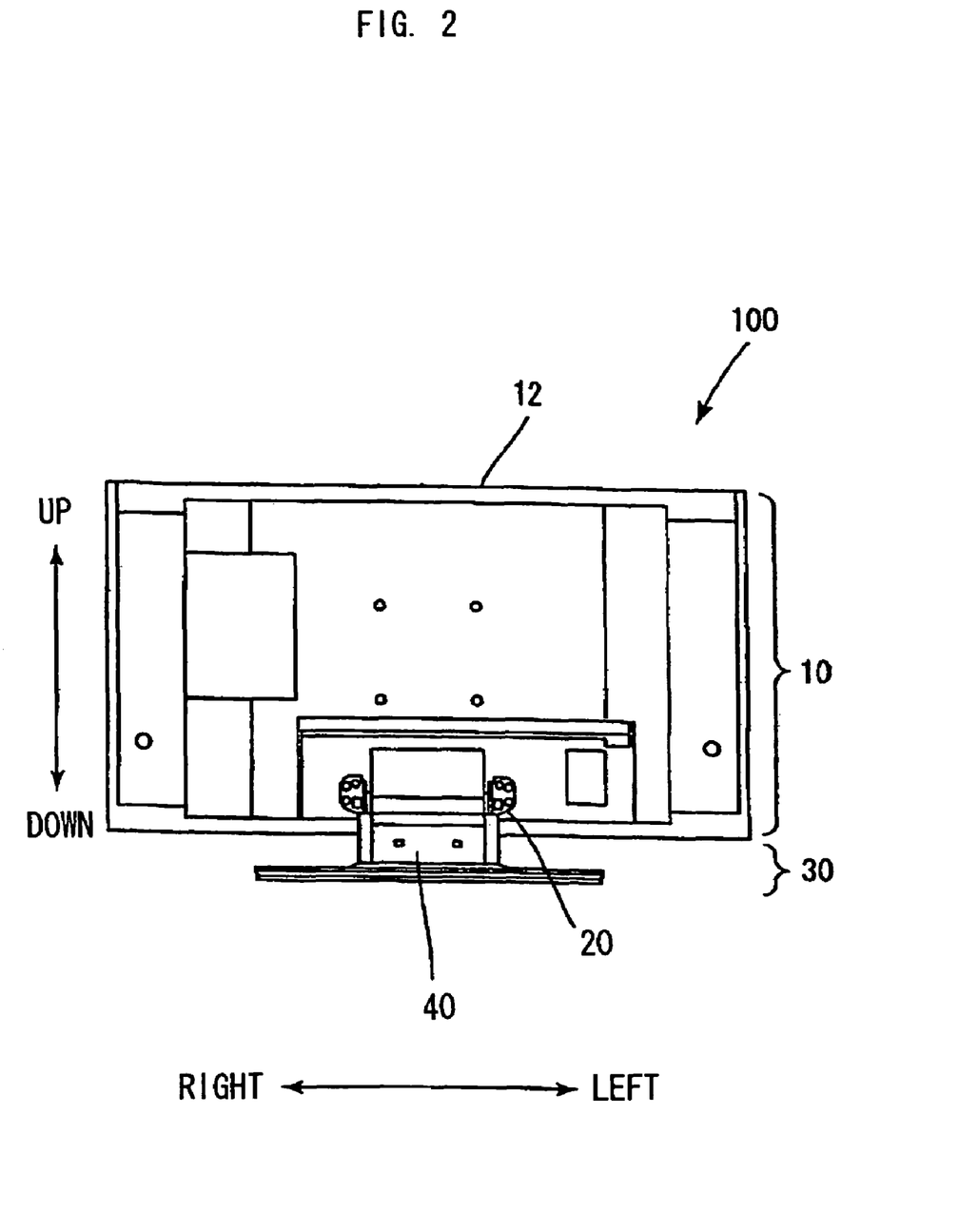
FIG. 2 is a rear view of the liquid crystal television.
Figure 3:
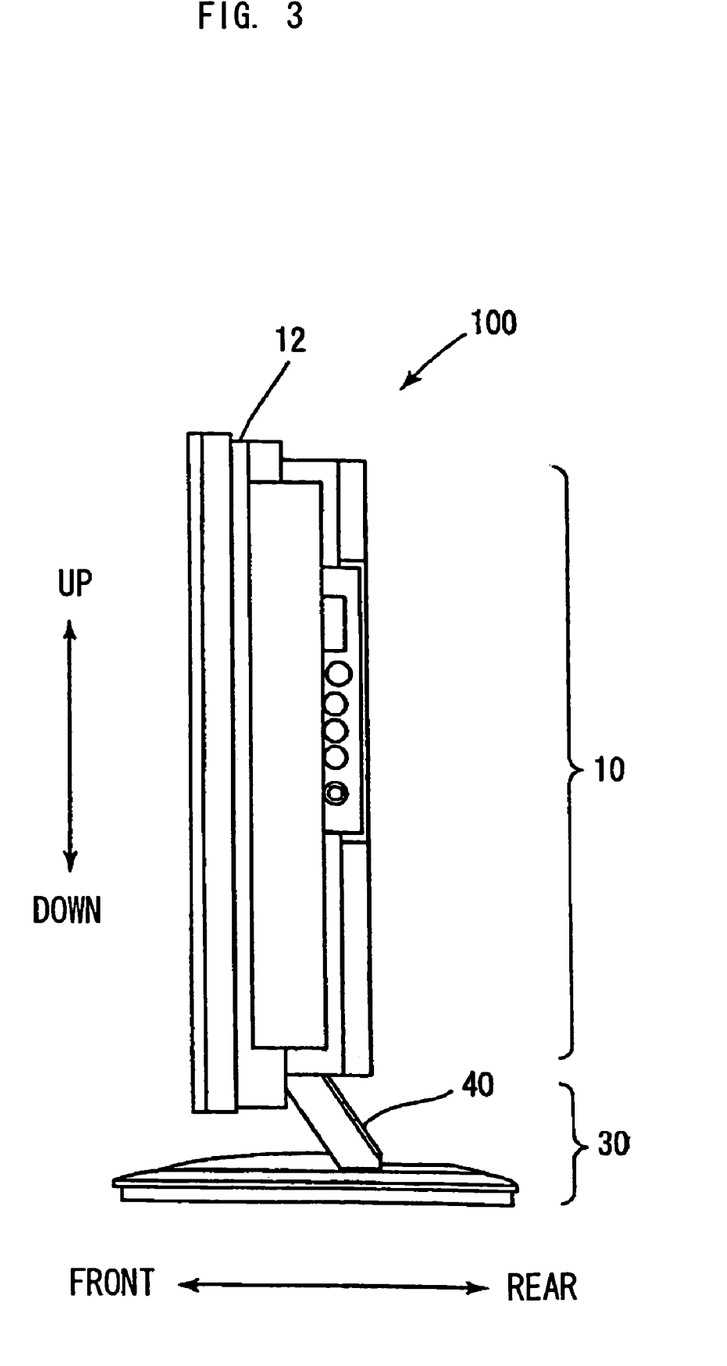
FIG. 3 is a right side elevational view of the liquid crystal television.
Figure 4:
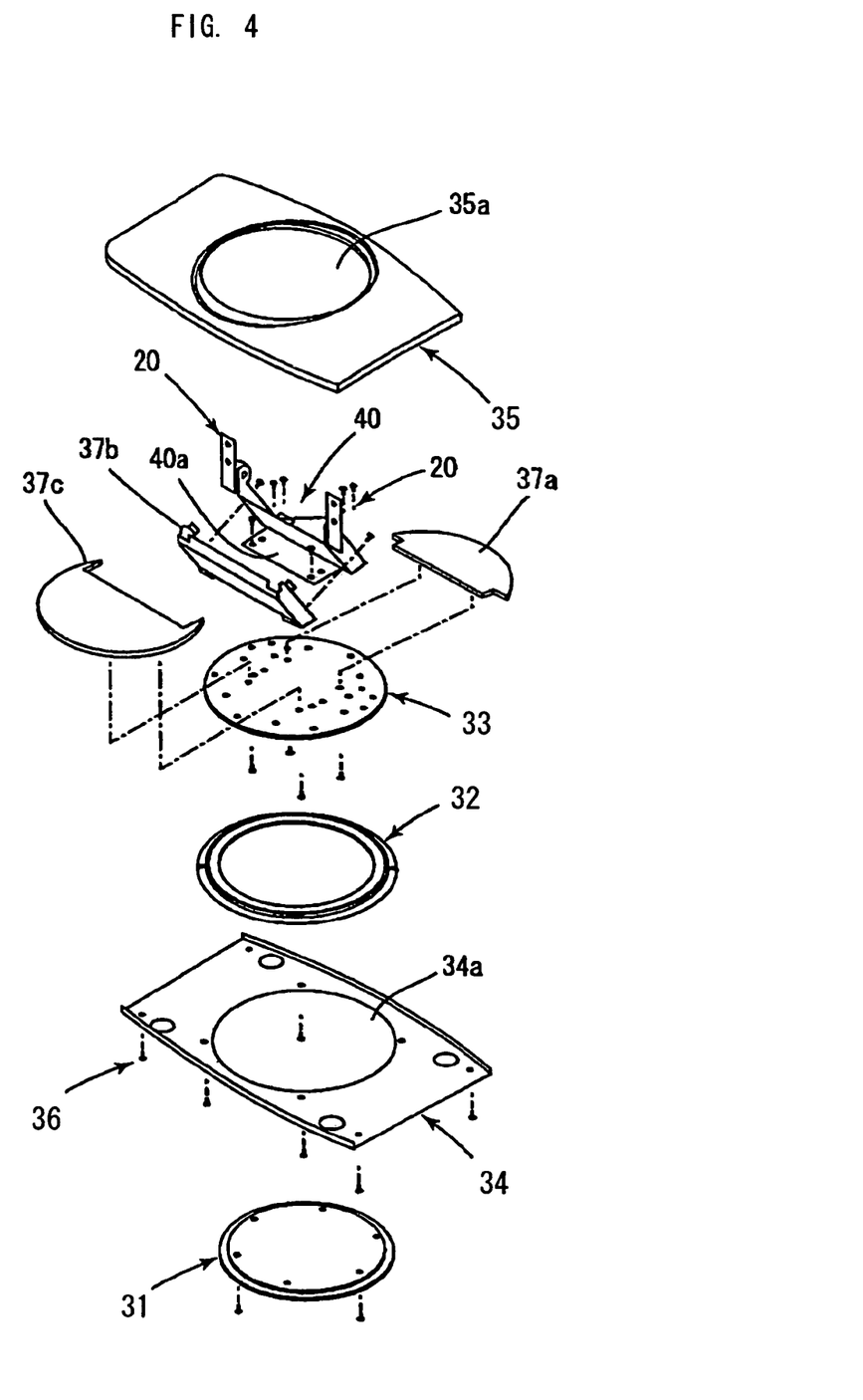
FIG. 4 is an exploded perspective view of a stand and a mainbody bracket of the television.
Figure 5:
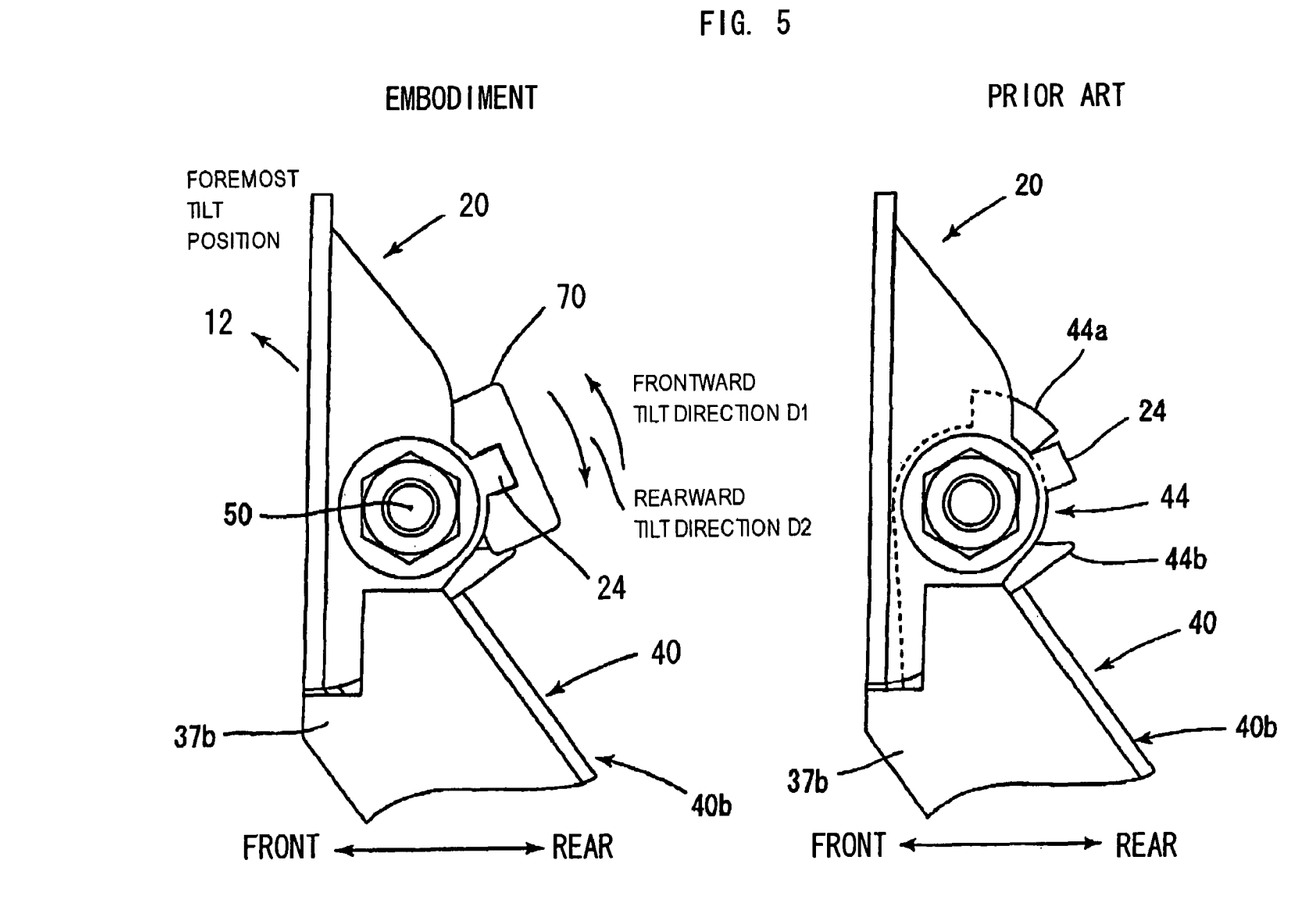
FIG. 5 shows a right side elevational view of a tilt mechanism according to the embodiment, and the conventional tilt mechanism.
Figure 6:
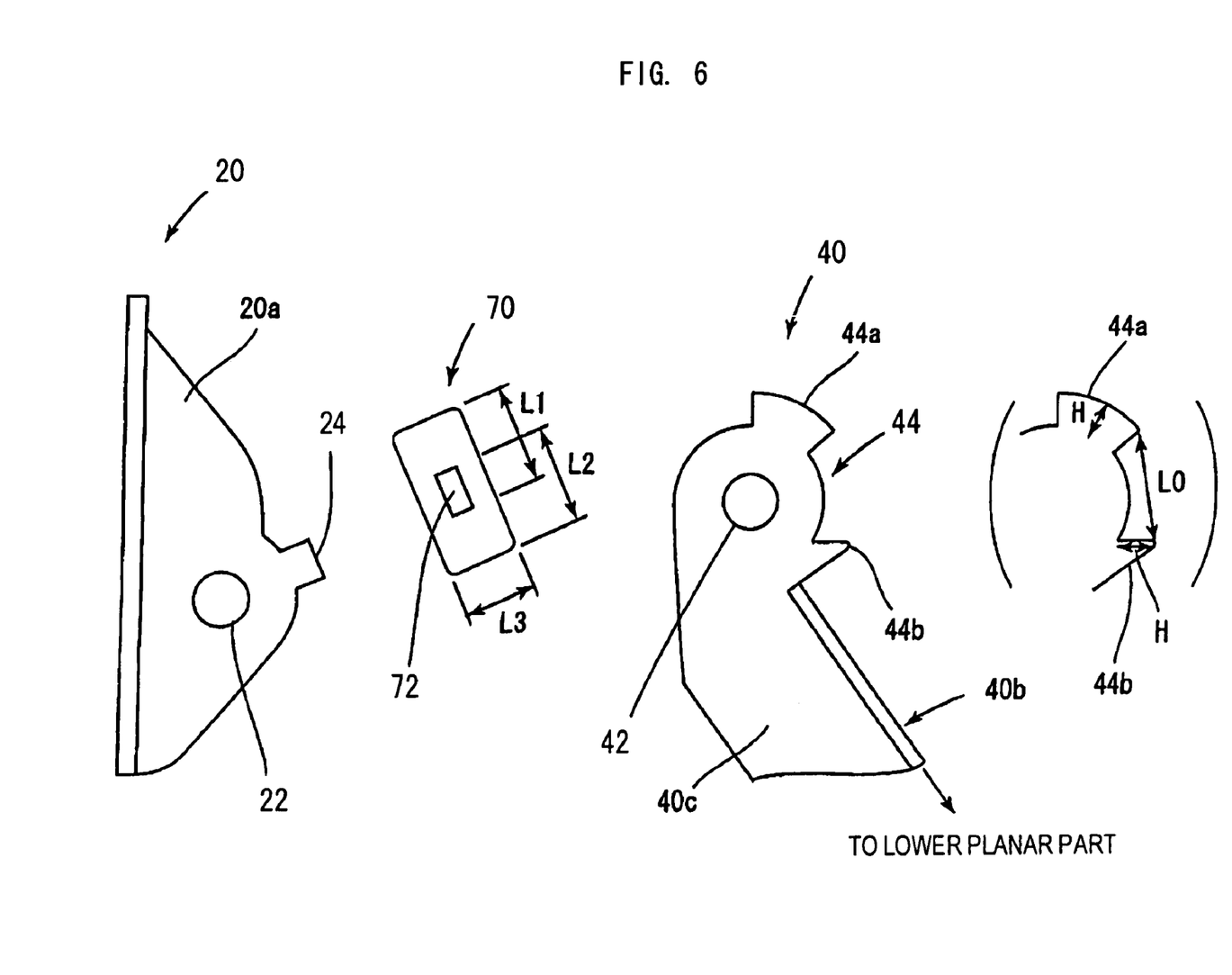
FIG. 6 is a right side elevational view of brackets and a washer-like member as exploded.
Figure 7:
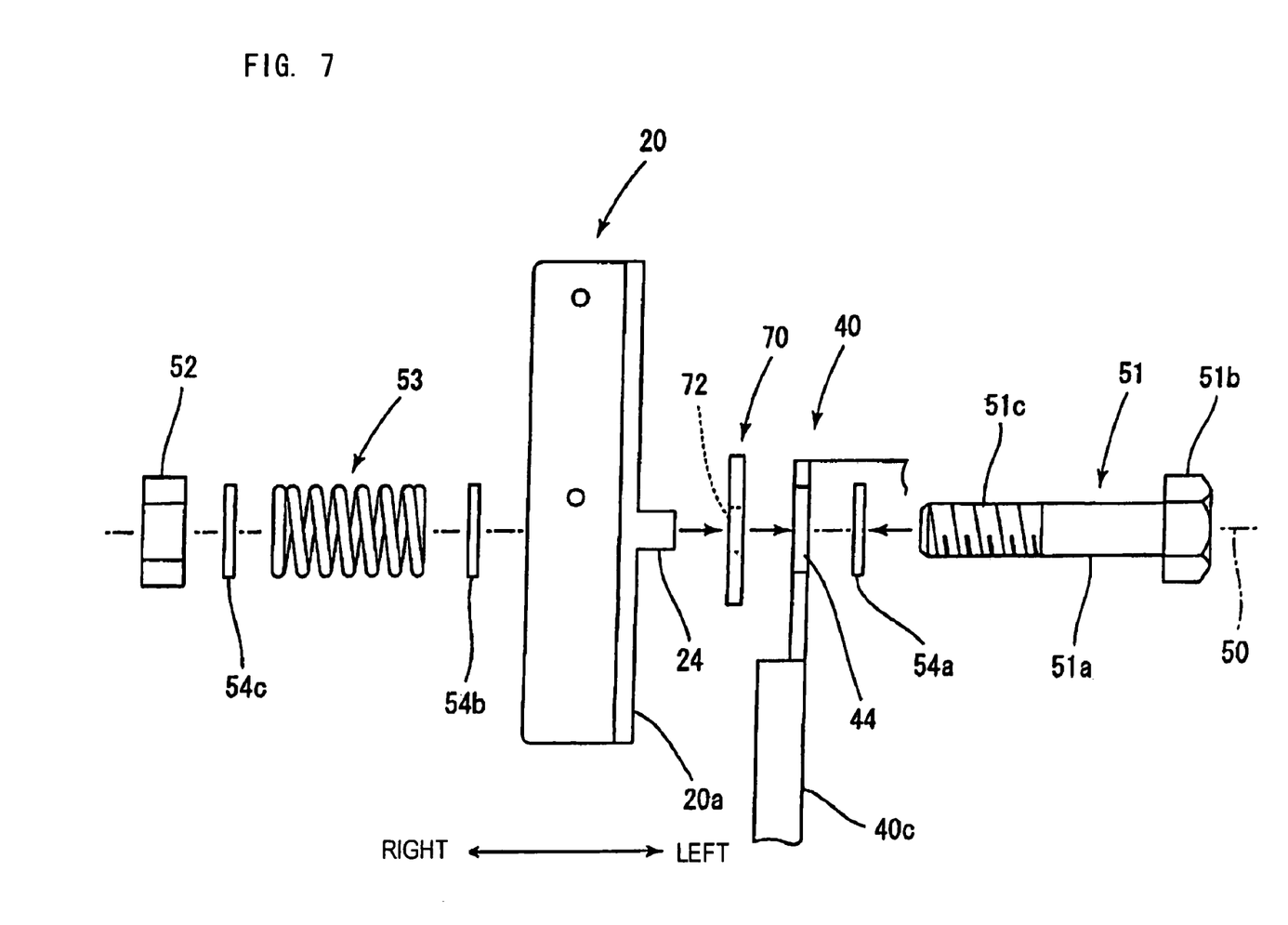
FIG. 7 is an exploded rear view illustrating how the brackets are attached to each other with bolts.
Figure 8:
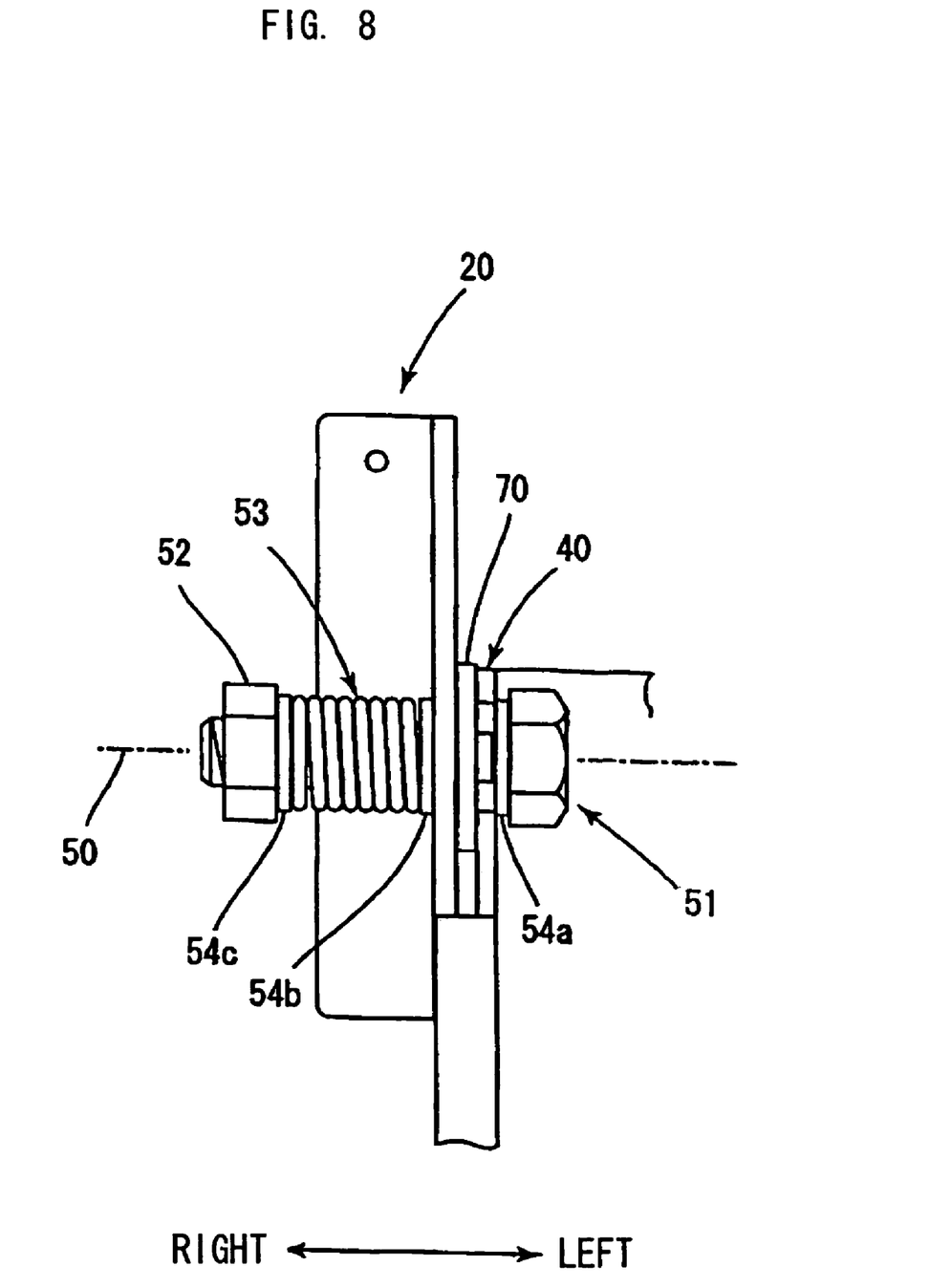
FIG. 8 is a rear view of the tilt mechanism as assembled.
Figure 9:
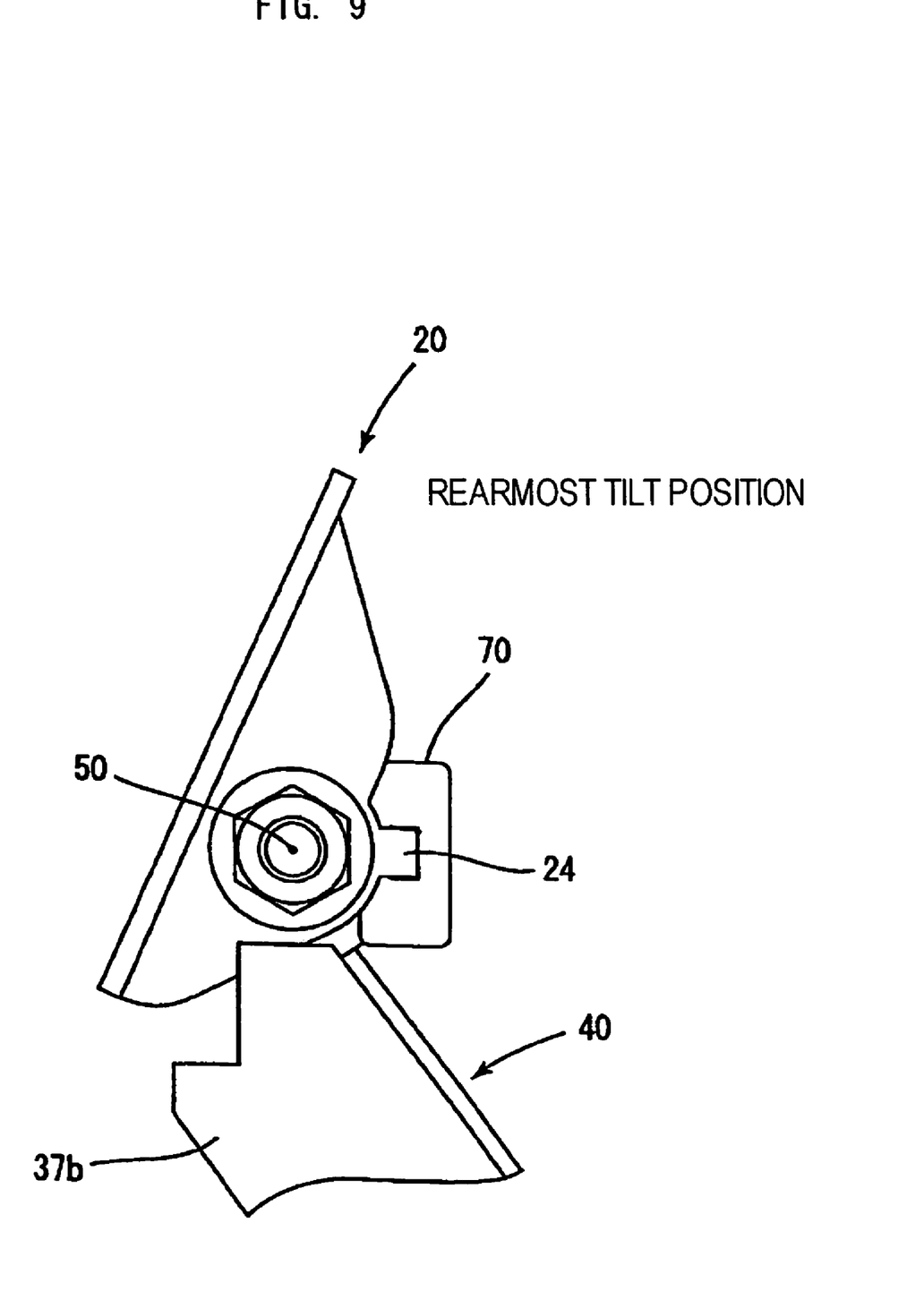
FIG. 9 is aright side elevational view of the tilt mechanism at its rearmost tilt position.

There will be described one embodiment of the invention, in the following order:
(1) Illustration of a liquid crystal display apparatus according to the embodiment
(2) Operation of the liquid crystal display apparatus
(3) Modifications of the embodiment
 (1) Illustration of a Liquid Crystal Display Apparatus According to the Embodiment FIG. 1 is a front elevational view of a liquid crystal television (hereinafter simply referred to as "TV") 100 as a liquid crystal display apparatus according to one embodiment of the invention. In the following description, any designated direction is that as seen in FIG. 1. FIG. 2 is a rear view of the TV, while FIG. 3 shows the TV as seen from its right side. FIG. 4 is an exploded perspective view showing a stand 30 having a swivel mechanism, and a mainbody bracket 20. In the left-hand side of FIG. 5, there are shown the mainbody bracket 20 and a stand bracket 40 constituting a tilt mechanism, and an inadvertent-insertion preventer in the form of a washer-like member 70, in a state where these members 20, 40, 70 are assembled. In the right-hand side of FIG. 5, there are shown brackets, as assembled, constituting the conventional tilt mechanism without the washer-like member. The tilt mechanism of the present invention as shown in FIG. 5 is a right-side one of two tilt mechanisms which are formed symmetrical with respect to a vertical line. FIG. 6 is an exploded right-side elevational view of the brackets and washer-like member constituting the right-side tilt mechanism. FIG. 7 is an exploded rear view illustrating how the brackets are attached to each other by means of a bolt 51 (as a bar member), while FIG. 8 is a rear view of the tilt mechanism as assembled. FIG. 9 is a right side elevational view of the tilt mechanism in its rearmost tilt position.

The TV 100 comprises the stand 30 as a base, a main body 10 supported tiltably with respect to the stand 30, members for connecting the stand 30 with the main body 10, such as a pair of metal bolts 51, a pair of metal hexagon nuts 52, a pair of helical springs or coil springs 53, and a pair of washers 54a, 54b and 54c, and a pair of plastic washer-like members 70. The stand bracket 40 or first bracket of a metal such as stainless steel is fixed to the stand 30 to be capable of swiveling, that is, turnable in a horizontal plane. The main body 10 comprises a resin housing or cabinet 12, and two mainbody brackets 20 or second brackets each made of a metal such as a stainless steel and fixed to the cabinet with screws. The main body comprises a receiver portion for receiving broadcast signals, a printed circuit board in which a control circuit is formed, and a liquid crystal display circuit having a liquid crystal display surface 14. The cabinet 12 has in its front face an opening formed correspondingly to the liquid crystal display surface, and accommodates the receiver portion, printed circuit board, and others. The control circuit implemented in the circuit board operates to receive airwaves and signals in a given format inputted through an external input terminal, and display images on the liquid crystal display surface and output sounds by means of an audio output portion. The cabinet 12 has a shape such that its lateral dimension is larger than its vertical dimension, corresponding to the shape of the liquid crystal display circuit, and its depth dimension is significantly smaller than the lateral and vertical dimensions. The main body 10 displays images on its liquid crystal display surface 14, and is supported to be tiltable with respect to the stand 30 with a rotation axis 50 extending in the left-right direction when the liquid crystal display surface 14 is seen from the front side.

As shown in FIG. 4, the stand 30 comprises various members 31-36, 37a-37c, 40, among which is the stand bracket 40. The stand bracket 40 has a lower planar part 40a horizontally extending, and an upper planar part 40b extending from a rear edge of the lower part 40a upward and frontward. A decorative cover 37b is attached to the bracket 40 with the lower part 40a frontward inserted in a lower portion of the cover 37b from its rear side. Then, the lower part 40a of the bracket 40 is fixed to an upper circular metal disc 33 with screws, and decorative covers 37a, 37c are fixed with screws to a rear side portion and a front side portion of the lower part 40a, respectively, with screws. An annular rotary support 32 is interposed between a lower circular metal disc 31 and the upper circular metal disc 33 on the lower and upper sides of the support 32, respectively, such that the rotary support 32 is capable of swiveling relatively to the metal discs 31, 33, which are fixed to each other with screws. A metallic bottom plate 34 has a circular opening 34a which has a diameter larger than that of the lower metal disc 31 and smaller than an external diameter of the rotary support 32 which is interposed between the discs 31, 33 and disposed on the bottom plate 34 at a position corresponding to the opening 34a. In this state, an upper cover 35, in which is formed a circular opening 35a having a diameter which is larger than that of the upper metal disc 33 but smaller than the external diameter of the rotary support 32 and such that the bracket 40 can be inserted through the opening 35a, is placed on the rotary support 32, which is thus interposed between the bottom plate 34 and upper cover 35 and fixed to these members 34, 35 with a plurality of screws 36. Accordingly, the discs 31, 33 are held to be rotatable between the bottom plate 34 and upper cover 35 via the rotary support 32, and the main body 10 attached to the bracket 40 is supported to be capable of swiveling.

When the mainbody brackets 20 have been attached to the stand bracket 40, a plastic cover (not shown) for covering the brackets 20, 40 is attached to the stand bracket 40.

Each of the bolts 51 has at one of its opposite axial ends a head 51b hexagonal in cross section, and at its other axial end a screw thread 51c. Each nut 52 is mounted on the screw thread 51c. Each set of the bolt 51 and nut 52 is attached to be turnable relatively to the brackets 20, 40 around the rotation axis 50.

The upper part 40b of the stand bracket 40 has a pair of vertical parts 40c each of which is a planar part extending in the front-rear direction. Each vertical part 40c has a first through-hole 42 for inserting a body 51a of one of the pair of bolts 51, and a first protrusion 44a, and a second protrusion 44b. The first protrusion 44a projects from an upper side of the vertical part 40c slightly rearward while the second protrusion 44c projects rearward, thereby providing a circular cutout or groove 44 at the rear side of the vertical part 40c between the first protrusion 44a and second protrusion 44b.

Each of the mainbody brackets 20 has a vertical planar part 20a extending in the front-rear direction. Each vertical part 20a has a second through-hole 22 for inserting the body 51a of the corresponding one of the bolts 51. A pawl 24 protrudes from a rear side of the vertical part 20a toward the stand bracket 40 and along the rotation axis 50.

The brackets 40, 20 are arranged along and around the rotation axis 50 with the body 51a of the bolt 51 inserted through the first and second through-holes 42, 22, such that the brackets 20, 40 are rotatable relatively to each other around the rotation axis 50.

The groove 44 of the stand bracket 40 delimits rotation of the pawl 24 of the mainbody bracket 20 such that the pawl 24 engages with the groove 44 and is brought into contact with opposite ends of the groove 44 when the brackets 20, 40 are relatively rotated in opposite directions D1, D2 around the rotation axis 50. When the main body 10 is tilted in the forward direction D1 with the pawl 24 brought into contact with the first protrusion 44a, the pawl 24 and main body 10 are placed in their foremost tilt position as shown in FIG. 5, when the main body 10 is tilted in the rearward direction D2 with the pawl brought into contact with the second protrusion 44b, the pawl 24 and the main body 10 are placed at their rearmost tilt position as shown in FIG. 9. That is, a range of rotation of the pawl 24 as defined by the groove 44 corresponds to a range between the foremost tilt position and the rearmost tilt position of the main body 10.

The body 51a of the bolt 51 is insertable through the helical spring 53 as shown in FIG. 7 which has an internal diameter smaller than external diameters of the head 51b and the nut 52.

Each bolt 51 is configured such that its body 51a has a diameter smaller than that of the first and second through-holes 42, 22, but its head 51b has a diameter larger than that of the first and second through-holes 42, 22. Each of the bolts 51 is attached to the brackets 20, 40 to be rotatable relatively to the brackets 20, 40 by inserting its body 51a through the washer 54a, first through-hole 42, second through-hole 22 of the mainbody bracket 20 to which the washer-like member 70 is attached, washer 54b, helical spring 53, and washer 54c, in the order of description, and mounting the nut 52 on the screw thread 51b with the helical spring 53 being compressed.

In the conventional arrangement, a finger of the user may be inadvertently put in the groove 44 of the stand bracket with which the rotatable pawl 24 of the mainbody bracket engages the cover concealing the brackets 20, 40 is removed. However, in this invention where the washer-like member 70 is attached to the pawl 24, a finger can not be inserted in the groove 44 even when the cover concealing the brackets is removed.

The washer-like member 70 is of a plastic, such as an alkylbenzene sulfonic acid (ABS) resin and a polypropylene resin, and has a third through-hole or perforated portion 72 through which only the pawl 24 is inserted and the body 51a of the bolt 51 is not inserted. Since the pawl 24 is planar, the through-hole 72 has a substantially rectangular or slit-like shape corresponding to the cross-sectional shape of the pawl 24 as seen perpendicularly to the direction of its insertion. The washer-like member 70 is sandwiched between the brackets 20, 40 with the pawl 24 inserted in the through-hole 72, thereby being attached to the brackets 20, 40 in contact with them 20, 40. As shown in FIGS. 5 and 9, the washer-like member 70 has a shape to conceal an entirety of the groove 44, when the stand bracket 40 is seen from the side of the washer-like member 70 in the direction of the rotation axis 50, wherever the pawl 24 is located within the permitted range of its rotation. As shown in FIG. 6, the washer-like member 70 is formed in a substantially rectangular shape, and a distance L1 from an upper end of the washer-like member 70 in its longitudinal direction to a lower end of the through-hole 72 in the longitudinal direction of the third through-hole 72 is not smaller than a distance L0 between the protrusions 44a and 44b, a distance L2 from an upper end of the through-hole 72 in its longitudinal direction to a lower end of the washer-like member in its longitudinal direction is not smaller than L0, and a distance L3 from a front end of the through-hole 72 in a direction along the shorter side thereof (which is perpendicular to the longitudinal direction thereof) to a rear end of the washer-like member 70 in the direction of the shorter side thereof is not smaller than the higher one H of heights of the protrusions 44a, 44b, so that the entirety of the groove 44 of the stand bracket 40 as seen from the side of the washer-like member 70 in the direction of the rotation axis 50, is concealed by the washer-like member 70.

As described above, the first bracket or mainbody bracket 20, and the second bracket or stand bracket 40 have the respective planar parts relatively rotatable around the rotation axis within a given range, and one of the planar parts has the pawl 24 bent toward the other planar part, while the other planar part has a substantially arc-shaped gap open in a radial direction of the first through-hole to engage with the pawl 24 to permit rotation thereof within the given angular range. The inadvertent-insertion preventer or washer-like member 70 is formed in a plate-like shape to be sandwiched between the planar parts, with the pawl 24 inserted through the through-hole 72 of the washer-like member 70, to cover the gap. It is noted that the gap corresponds to the groove 44.

(2) Operation of the Liquid Crystal Display Apparatus

After the pawl 24 is inserted through the through-hole 72 of the washer-like member 70, the washer-like member 70 is sandwiched between the brackets 20, 40, and these members 70, 20, 40 as well as the helical spring 53 and others are connected by means of the bolt 51 and nut 52. Thus, when the main body 10 is tilted, by a hand of the user or otherwise, the main body is held at a desired rotation or tilt position without freely rotating due to a biasing force of the helical spring 53 as compressed.

In this state, when the main body 10 is rotated in a direction to lean forward, the main body can be tilted up to the foremost tilt position at which the pawl 24 is brought into contact with the first protrusion 44a. At this position as shown in FIG. 5, when the stand bracket 40 is seen from the side of the washer-like member 70 in the direction of the rotation axis 50, the washer-like member 70 conceals the entire groove 44 of the bracket 40. On the other hand, when the main body is rotated in a direction to lean backward, the main body can be tilted up to the rearmost tilt position at which the pawl 24 is brought into contact with the second protrusion 44a. At this position as shown in FIG. 9, too, when the stand bracket 40 is seen from the side of the washer-like member 70 in the direction of the rotation axis 50, the washer-like member 70 conceals the entire groove 44 of the bracket 40. The washer-like member 70 conceals the entire groove 44 wherever the main body is positioned between the foremost and rearmost tilt positions.

According to the embodiment, the entire groove of the stand bracket is kept covered by the washer-like member wherever the pawl is located within the range of rotation thereof, enabling to reliably prevent insertion of a finger of the user in the groove of the stand bracket even without a cover concealing the brackets. Further, since the washer-like member is attached to the pawl while sandwiched between the brackets, it is not necessary to configure the pawl to inhibit the washer-like member from coming off, thereby enabling to attach the washer-like member to the pawl with a simple structure. Further, since the washer-like member is of a plastic, the main body of the television is smoothly tiltable. Still further, since it is not necessary to insert the bolt providing a rotation axis through the washer-like member, the configuration of the washer-like member is simple. In addition, when the main body of the television is tilted, the main body can be held at a desired tilt position to which the main body is turned as a force for holding the position of the main body, which is based on the biasing force of the helical spring as being compressed, is adjusted.

(3) Modifications of the Embodiment

Various modifications may be made to the embodiment.

Although the liquid crystal television of the invention is preferably small to medium sized with its screen size under about 25-inch so that the television is light weighted and easily tiltable, the television may be medium to large sized. The television may be a liquid crystal television incorporating a video cassette recorder, a DVD player, and/or others. Further, the invention is applicable to a liquid crystal display which does not include a tuner or receiver for receiving airwaves, and also to a liquid crystal display which includes a tuner.

Figure 10:
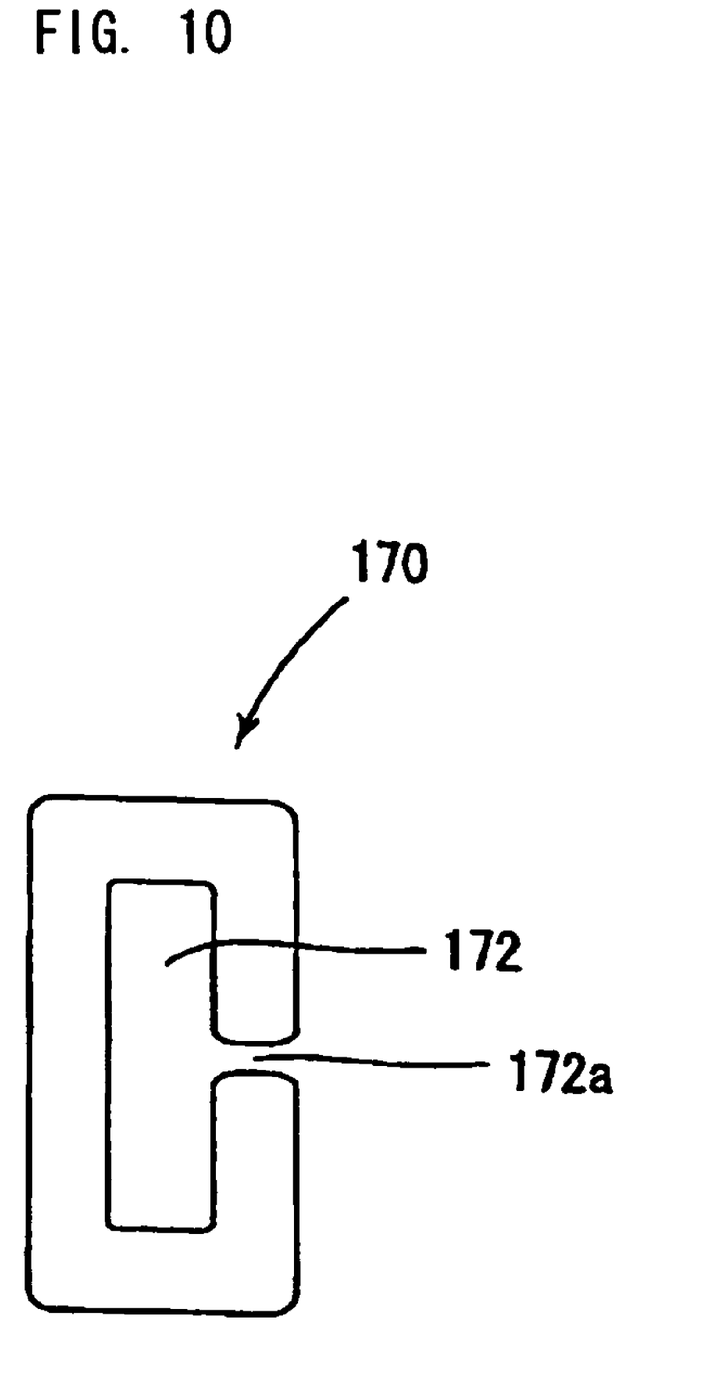
FIG. 10 is a right side elevational view of an inadvertent-insertion preventer as a modification of one according to the embodiment.

As shown in FIG. 10, an inadvertent-insertion preventer 170 having a through-hole 172 with an opening 172a as seen from the right side, may be used in place of the washer-like member 70 having a simple through-hole without such an opening.

An end portion (a right-side portion as seen in FIG. 7) of the pawl 24 may be further bent to the front or rear side to form an engaging part for preventing the inadvertent-insertion preventer from coming off. When such an engaging part is provided, after the vertical parts 20a, 40c of the brackets 20, 40 are superposed or made to contact with each other, the pawl 24 is inserted through the through-hole of the inadvertent-insertion preventer to have the inadvertent-insertion preventer in contact with the vertical part 40 of the stand bracket, and the body 51a of the bolt 51 is sequentially inserted through the washer 54a, first through-hole 42, second through-hole 22, washer 54b, spring 53, and washer 54c, so as to have the brackets 20, 40 relatively rotatable.

Some or all of the washers 54a, 54b, 54c, through which the body 51a of the bolt is inserted, may be omitted.

The tilt mechanism may be such that the stand bracket has a pawl, while the mainbody bracket has a groove with which the pawl engages and which limits rotation of the pawl within a given rotation range such that the pawl as rotated in two opposite directions is brought into contact with opposite ends of the groove.

In each of the above-described modifications, the same operation and effects as those of the embodiment can be obtained, preventing insertion of a finger of the user in the groove of the bracket even while the cover concealing the brackets is removed.

I claim:

1. A liquid crystal television comprising:
a stand to which a stand bracket is fixed, the stand bracket being made of a metal and having a first through-hole and a groove;
a main body which has a resin cabinet to which a mainbody bracket is fixed, and a liquid crystal display surface for presenting images thereon, the mainbody bracket being made of a metal and having a second through-hole and a pawl, the main body being supported to be tiltable with respect to the stand around a rotation axis which extends in the left-right direction when the liquid crystal display surface is seen from the front side, and the pawl protruding along the rotation axis toward the stand bracket to engage with the groove of the stand bracket;
a bar member in the form of a metallic bolt comprising:
a bolt body inserted through the first and second through-holes to be attached to the stand bracket and the mainbody bracket which are disposed adjacent to each other around and along the rotation axis, such that the bolt is rotatable relatively to the stand bracket and the mainbody bracket, and the stand bracket and the mainbody bracket are rotatable relatively to each other around the rotation axis, the relative rotation of the stand bracket and the mainbody bracket being limited such that rotation of the pawl is limited to a rotation range by contact of the pawl with opposite ends of the groove, and the bolt body having a screw thread formed on one of its opposite axial end portion; and
a head formed at one of opposite axial ends of the bolt body which is remote from the screw thread, and having a diameter larger than those of the first and second through-holes;
a metal nut threadedly engaging the screw thread;
a helical spring through which the bolt body is insertable, and which has an internal diameter smaller than the diameter of the head and a major diameter of the nut;
the bolt body being inserted through the first and second through-holes and the helical spring, with the screw thread engaging the nut, and with the helical spring being compressed; and
a plastic washer-like member which has a third through-hole through which the pawl is inserted and the bolt is not inserted, and is attached between the stand bracket and the mainbody bracket with the pawl inserted through the third through-hole, the washer-like member having a shape to conceal an entirety of the groove as seen from the side of the washer-like member in the direction of the rotation axis wherever the pawl is located within the rotation range.

2. A liquid crystal display apparatus comprising:
a stand to which a first bracket is fixed;
a main body having a cabinet to which a second bracket is fixed, and a liquid crystal display surface on which images are presented, the main body being supported to be tiltable around a rotation axis with respect to the stand;
the first and second brackets being disposed adjacent to each other around and along the rotation axis to be rotatable around the rotation axis relatively to each other, one of the first and second brackets having a pawl protruding to the other of the brackets, while the other bracket having a groove with which the pawl engages such that the relative rotation of the brackets is limited to a rotation range by contact of the pawl with opposite ends of the groove; and
an inadvertent-insertion preventer for inhibiting an object from being inadvertently put in the groove, the preventer having a perforated portion, and being attached, at a position to contact the other bracket, to the pawl by insertion of the pawl through the perforated portion.

3. The liquid crystal display apparatus of claim 2, wherein the inadvertent-insertion preventer is attached to the pawl by being sandwiched between the first and second brackets.

4. The liquid crystal display apparatus of claim 3, wherein each of the first and second brackets is made of a metal, the inadvertent-insertion preventer is made of a plastic, and the perforated portion is a through-hole through which the pawl is inserted.

5. The liquid crystal display apparatus of claim 3, further comprising a bar member,
wherein the first bracket has a first through-hole whose center is on the rotation axis while the second bracket has a second through-hole whose center is on the rotation axis, the bar member being attached to the first and second brackets on and along the rotation axis by being inserted through the first and second through-holes such that the bar member is rotatable relatively to the first and second brackets,
wherein the pawl protrudes along the rotation axis,
and wherein the perforated portion of the inadvertent-insertion preventer is a through-hole through which the pawl is inserted and the bar member is not inserted.

6. The liquid crystal display apparatus of claim 5, further comprising a metal nut and a helical spring,
wherein the bar member is a metal bolt having a bolt body inserted through the first and second through-holes and the helical spring, and having a head at its one of opposite axial ends and a screw thread at its other axial end, the head having a diameter larger than those of the first and second through-holes,
wherein the metal nut threadedly engaging the screw thread formed on the other end of the bolt body, while the helical spring having an internal diameter smaller than the diameter of the head and a major diameter of the nut,
and wherein the bolt body is inserted through the first and second through-holes and the helical spring, with its screw thread threadedly engaging the nut, and with the helical spring being compressed.

7. The liquid crystal display apparatus of claim 2, wherein the inadvertent-insertion preventer has a shape to conceal an entirety of the groove when the other bracket having the groove is seen from the side of the inadvertent-insertion preventer in the direction of the rotation axis wherever the pawl is located within the rotation range.

8. The liquid crystal display apparatus of claim 2,
wherein each of the first and second brackets has a planar part, the planar parts being relatively rotatable around the rotation axis within the rotation range, and one of the planar parts having the pawl bent toward the other planar part, while the other planar part having the groove in the form of a substantially arc-shaped gap open in a radial direction with respect to the rotation axis to engage with the pawl to permit rotation of the pawl within an angular range, and wherein the inadvertent-insertion preventer is formed in a plate-like shape and sandwiched between the planar parts, with the pawl inserted through the perforated portion of the inadvertent-insertion preventer to cover the gap.

* * * * *